US007321450B2

(12) United States Patent  
Uekusa et al.

(10) Patent No.: US 7,321,450 B2  
(45) Date of Patent: Jan. 22, 2008

(54) IMAGE PROCESSING METHOD, IMAGE PROCESSING APPARATUS, AND RECORDING MEDIUM

(75) Inventors: Akihiko Uekusa, Kanagawa-ken (JP); Nobuo Ogura, Tokyo (JP); Manabu Yamazoe, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 10/894,012

(22) Filed: Jul. 20, 2004

(65) Prior Publication Data

US 2004/0252345 A1 Dec. 16, 2004

Related U.S. Application Data

(62) Division of application No. 09/336,987, filed on Jun. 21, 1999, now Pat. No. 6,791,711.

(30) Foreign Application Priority Data

Jun. 24, 1998 (JP) ............................. 11-177130  
Jun. 24, 1998 (JP) ............................. 11-177131

(51) Int. Cl.  
*H04N 1/387* (2006.01)  
*H04N 1/40* (2006.01)  
*H04N 1/56* (2006.01)  
*H04N 1/60* (2006.01)

(52) U.S. Cl. .................. 358/2.1; 358/3.24; 358/518; 358/538; 358/540

(58) Field of Classification Search ................ 358/1.9, 358/1.18, 3.24, 530, 538, 540, 453; 382/164, 382/167, 173, 176, 282

See application file for complete search history.

(56) References Cited

U.S. PATENT DOCUMENTS

| 4,571,632 A | 2/1986 | Schaphorst et al. ......... 358/260 |
| 4,926,251 A | 5/1990 | Sekizawa et al. ........... 358/535 |
| 5,018,008 A | 5/1991 | Asada .......................... 358/78 |
| 5,072,291 A | 12/1991 | Sekizawa .................... 358/535 |
| 5,119,207 A | 6/1992 | Niitsuma .................... 358/296 |
| 5,140,649 A | 8/1992 | Kageyama .................. 382/167 |
| 5,315,389 A | 5/1994 | Izawa et al. ................ 348/672 |
| 5,315,691 A | 5/1994 | Sumiya et al. ............. 395/109 |
| 5,349,452 A | 9/1994 | Maeda et al. ............... 358/527 |
| 5,465,165 A | 11/1995 | Tanio et al. ................ 358/448 |
| 5,467,196 A | 11/1995 | Fukushima et al. ......... 358/298 |
| 5,489,997 A | 2/1996 | Usami |

(Continued)

FOREIGN PATENT DOCUMENTS

JP 04-260121 9/1992

(Continued)

*Primary Examiner*—Scott A. Rogers  
(74) *Attorney, Agent, or Firm*—Fitzpatrick, Cella, Harper & Scinto

(57) ABSTRACT

According to an image processing method for performing color processing in accordance with a plurality of image objects, image data representing the plurality of image objects is input. The relationship between the plurality of image objects is analyzed. The plurality of image objects are grouped based on the result of analysis. The same color processing condition is set for the plurality of image objects belonging to the same group. Thus, the same color processing condition is set for the plurality of image objects divided from a single original image, thereby obtaining a high-quality output image.

19 Claims, 13 Drawing Sheets

U.S. PATENT DOCUMENTS

| | | | |
|---|---|---|---|
| 5,506,944 A | 4/1996 | Gentile | 395/114 |
| 5,539,523 A | 7/1996 | Nakai et al. | 358/296 |
| 5,552,905 A | 9/1996 | Tanaka | 358/523 |
| 5,726,778 A | 3/1998 | Tanio | 358/501 |
| 5,727,137 A | 3/1998 | LeClair et al. | 375/116 |
| 5,748,773 A | 5/1998 | Tashiro et al. | 382/169 |
| 5,748,802 A | 5/1998 | Winkelman | 382/271 |
| 5,828,780 A | 10/1998 | Suzuki et al. | 382/167 |
| 5,874,988 A | 2/1999 | Gu | 348/97 |
| 5,943,045 A * | 8/1999 | Ikeshoji et al. | 382/162 |
| 5,949,427 A | 9/1999 | Nishikawa et al. | 345/431 |
| 5,949,555 A * | 9/1999 | Sakai et al. | 358/462 |
| 6,008,812 A * | 12/1999 | Ueda et al. | 345/418 |
| 6,040,927 A | 3/2000 | Winter et al. | 358/534 |
| 6,052,203 A | 4/2000 | Suzuki et al. | 358/1.9 |
| 6,226,011 B1 | 5/2001 | Sakuyama et al. | 345/431 |
| 6,266,152 B1 | 7/2001 | Nakajima | 358/1.9 |
| 6,337,922 B2 | 1/2002 | Kumada | 382/162 |
| 6,351,557 B1 | 2/2002 | Gonsalves | 382/167 |
| 6,791,711 B1 * | 9/2004 | Uekusa et al. | 358/1.9 |
| 6,891,970 B1 * | 5/2005 | Suzuki | 382/167 |
| 2006/0209369 A1 * | 9/2006 | Yasunaga | 358/538 |

FOREIGN PATENT DOCUMENTS

| | | |
|---|---|---|
| JP | 07-220067 A | 8/1995 |
| JP | 09-326922 A | 12/1997 |

* cited by examiner

| TABLE [ ] | | | |
|---|---|---|---|
| INDEX | GROUP ID | DRAWING COMMAND INFORMATION | SAMPLING INFORMATION |
| 0 | | Image Info VALUE | Histgram Info VALUE |
| 1 | | Image Info VALUE | Histgram Info VALUE |
| 2 | | Image Info VALUE | Histgram Info VALUE |
| 3 | | Image Info VALUE | Histgram Info VALUE |
| m | n | Image Info VALUE | Histgram Info VALUE |

FIG. 4

| Image Info VALUE |
| --- |
| DRAWING POSITIONS : X, Y, W, H |
| BITS OF ORIGINAL IMAGE |
| Source Color Space INFORMATION |
| Color Matching Intent SPECIFIED VALUE |

FIG. 5

| TABLE [ ] |||| 
|---|---|---|---|
| INDEX | GROUP ID | Image Info | SAMPLING INFORMATION |
| 0 | 0 | Image Info 0 | Hist Info 0 |
| 1 | 0 | Image Info 1 | Hist Info 0 |
| 2 | 1 | Image Info 2 | Hist Info 1 |
| 3 | 1 | Image Info 3 | Hist Info 1 |
| 4 | 1 | Image Info 4 | Hist Info 1 |

TABLE [ ] WHEN FIRST PROCESSING FLOW HAS COMPLETED

FIG. 9

IMAGE PROCESSING METHOD, IMAGE PROCESSING APPARATUS, AND RECORDING MEDIUM

CROSS REFERENCE TO RELATED APPLICATION

This application is a division of application Ser. No. 09/336,987, filed Jun. 21, 1999 now U.S. Pat. No. 6,791,711.

BACKGROUND OF THE INVENTION

1. Field of the Invention

The present invention relates to an image processing method and an image processing apparatus, and also to a recording medium.

2. Description of the Related Art

To obtain a high-quality image from image data when it is output from a printer or a display unit, it is necessary to perform color processing, such as color correction, color conversion, binary-quantizing processing, etc., according to the type of object, on each of a plurality of objects forming the image. Generally, to print or display an image created by a computer application to a printer or on a display unit, a device driver or a device forms an image from a group of drawing commands output from the application and generates image data of the whole page.

A drawing command group forming a document is issued to a device driver according to the type of data, such as, image drawing commands issued for photographs, text drawing commands output for text, and graphics drawing commands issued for graphics. Then, the device driver performs color processing suitable for the object according to the type of command and converts the data into an image of the form which can be output by the output device.

In this case, color-matching processing can be switched according to the type of data, such as saturation color processing for graphics, calorimetric processing for text, and perceptual color processing for photographs, thereby achieving a high quality output on all the objects of the whole page.

By utilizing a certain type of system and application, it has become possible to specify a source color space for the objects, enabling the device driver to perform color processing by using the specified source color space, resulting in a higher quality output. More specifically, for example, when an image input by a scanner is pasted in a document, a color profile indicating the device characteristics of the scanner is specified for the corresponding image drawing commands. Or, when color calibration is performed on a display unit, a color profile indicating the characteristics of the monitor used can be designated to reproduce the color viewed by the editor. The above-mentioned color profiles are, for example, International Color Consortium (ICC) profiles, which can be used by the system, such as the Windows ICM system of Microsoft Corporation, or the ColorSync system of Apple Computer Inc.

However, even by the use of such a precise color-matching processing system, if an original photographic image is a poor quality, a high quality and aesthetically pleasant image cannot be expected. For example, in a conventional system, if an image photographed by a digital camera, which is coming into widespread use, is unsuitably exposed, the resulting image faithfully reflects the unsuitably exposed image when it is printed, thereby failing to achieve an image of a very good quality. In order to overcome such a drawback, a user performs image correction, such as nonlinear color balance processing, for correcting the inappropriate exposure of the document image, on the whole document image by using, for example, image retouching software. However, the user without a good knowledge and experience in the corresponding operation has to depend on trial-and-error methods in order to set a suitable correcting operation, which is very time-consuming.

Additionally, concerning already printed document data, such as a DTP document pasted with an uncorrected photograph, the following complicated operation is necessary to conduct image correction only on the photograph portion of the document image. That is, an image portion should be first designated and cut from the document image, and then corrected by using the image retouching software, and again pasted in the document image.

In a comparatively high-end application which aims to optimize the efficiency in using the memory and the processing rate, a large image, such as that shown in FIG. 8, may sometimes be internally divided and processed by a plurality of image drawing commands. This type of processing is often executed in, for example, the Adobe PhotoShop v4.0 application.

Thus, if the operation for determining conditions for performing color processing, for example, for correcting the exposure of the document image, according to the color distribution of the document image, is conducted on each of the divided object images, the following problem arises. Color processing conditions are set for each of the different parts which have been internally divided from a single original image by using an application. This may disadvantageously disturb the continuity of color at the interfaces of the parts.

It is also necessary to analyze the color distribution of the original image for automatically setting image-correction processing, such as nonlinear color balancing for correcting the exposure of the original image. Conventionally, to increase the processing rate, image data is sampled according to predetermined sampling conditions regardless of the image conditions. However, by using this conventional method in current systems for inputting various sizes of image data, a sufficient number of samples of image data is not provided, thereby failing to set optimal processing conditions, or an excessively large number of samples of image data is provided, thereby increasing the processing time. That is, according to the conventional method, optimal processing conditions cannot be efficiently set.

SUMMARY OF THE INVENTION

Accordingly, in view of the above background, it is an object of the present invention to easily perform suitable image-correction processing.

It is another object of the present invention to automatically perform image-correction processing on a predetermined type of object image contained in an input image in accordance with the color distribution.

It is still another object of the present invention to suitably determine whether image-correction processing in accordance with the color distribution of an input image is to be performed.

It is a further object of the present invention to obtain a high-quality output image by setting the same color processing conditions for a single original image.

It is a further object of the present invention to efficiently determine color processing conditions by setting the sampling conditions according to the size of image data.

To achieve the above-described object, according to one aspect of the present invention, there is provided an image processing method for performing image-correction processing in accordance with a color distribution of an input image. The method includes the steps of inputting an image object which forms the input image, determining the type of the input image object, and controlling, based on a result obtained in the determining step, a determination of whether the image-correction processing in accordance with the color distribution of the image object is to be performed on the image object.

According to another aspect of the present invention, there is provided an image processing method, including inputting image data representing an input image, determining whether color-matching processing has been performed on the image data by analyzing header information of the image data, and making a decision, based on a result obtained in the determining step, of whether image-correction processing in accordance with a color distribution of the input image is to be performed.

According to still another aspect of the present invention, there is provided an image processing apparatus including image processing means for performing image-correction processing in accordance with a color distribution of an input image. Input means inputs image objects which form the image. Determining means determines the type of each of the input image objects. Control means controls, based on a result obtained by the determining means, whether the image-correction processing in accordance with the color distribution of the image object is to be performed. Synthesizing means synthesizes the image objects which have undergone the image-correction processing so as to obtain a synthesized image. Output means outputs the synthesized image.

According to a further aspect of the present invention, there is provided an image processing apparatus including input means for inputting image data representing an input image. Determining means determines whether color-matching processing has been performed on the image data by analyzing header information of the image data. Decision means makes a decision, based on a result obtained by the determining means, of whether image-correction processing in accordance with a color distribution of the input image is to be performed on the input image. Image-correction processing means performs the image-correction processing on the input image according to a result obtained by the decision means.

According to a further aspect of the present invention, there is provided a recording medium for recording a program implementing an image processing method for performing image-correction processing in accordance with a color distribution of an input image. The program includes the steps of inputting an image object which forms the input image, determining the type of the input image object, and controlling, based on a result obtained in the determining step, a determination of whether the image-correction processing in accordance with the color distribution of the image object is to be performed on the image object.

According to a further aspect of the present invention, there is provided a recording medium for recording an image processing program. The program includes the steps of inputting image data representing an input image, determining whether color-matching processing has been performed on the image data by analyzing header information of the image data, and making a decision, based on a result obtained in the determining step, of whether image-correction processing in accordance with a color distribution of the input image is to be performed.

According to a further aspect of the present invention, there is provided an image processing method for performing color processing in accordance with a plurality of image objects. The method includes the steps of inputting image data indicating the plurality of image objects, analyzing a relationship between the plurality of image objects, grouping the plurality of image objects based on a result obtained in the analyzing step, and setting an identical color processing condition for the grouped image objects.

According to a further aspect of the present invention, there is provided an image processing method, including the steps of inputting image data representing an input image, setting a sampling condition in accordance with a data size of the input image, sampling the input image data according to the sampling condition set in the setting step, and determining a processing condition by analyzing the sampled image data.

According to a further aspect of the present invention, there is provided an image processing apparatus for performing color processing in accordance with a plurality of image objects. The apparatus includes input means for inputting image data representing the plurality of image objects. Analyzing means analyzes a relationship between the plurality of image objects. Grouping means groups the plurality of image objects based on a result obtained by the analyzing means. Setting means sets an identical color processing condition for the grouped image objects. Color processing means performs color processing on the image objects based on the color processing condition set by the setting means.

According to a further aspect of the present invention, there is provided an image processing apparatus including input means for inputting image data representing an input image. Setting means sets a sampling condition in accordance with a data size of the input image. Sampling means samples the input image data according to the sampling condition set by the setting means. Determining means determines a processing condition by analyzing the image data sampled by the sampling means.

According to a further aspect of the present invention, there is provided a recording medium for recording a program implementing an image processing method for performing color processing in accordance with a plurality of image objects. The program including the steps of inputting image data representing the plurality of image objects, analyzing a relationship between the plurality of image objects, grouping the plurality of image objects based on a result obtained by the analyzing means, and setting an identical color processing condition for the grouped image objects.

According to a further aspect of the present invention, there is provided a recording medium for recording a program implementing processing for setting a processing condition. The program includes the steps of setting a sampling condition in accordance with a data size of the input image, sampling the input image data according to the sampling condition set in the setting step, and determining a processing condition by analyzing the sampled image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 illustrates an example of the configuration of a table;

FIG. 5 illustrates an example of the configuration of an ImageInfo value;

FIG. 9 illustrates an example of the table obtained upon completion of the first print-data processing flow;

DESCRIPTION OF THE PREFERRED EMBODIMENTS

First Embodiment

An embodiment of the present invention is described in detail below with reference to the drawings.

Figure 1:
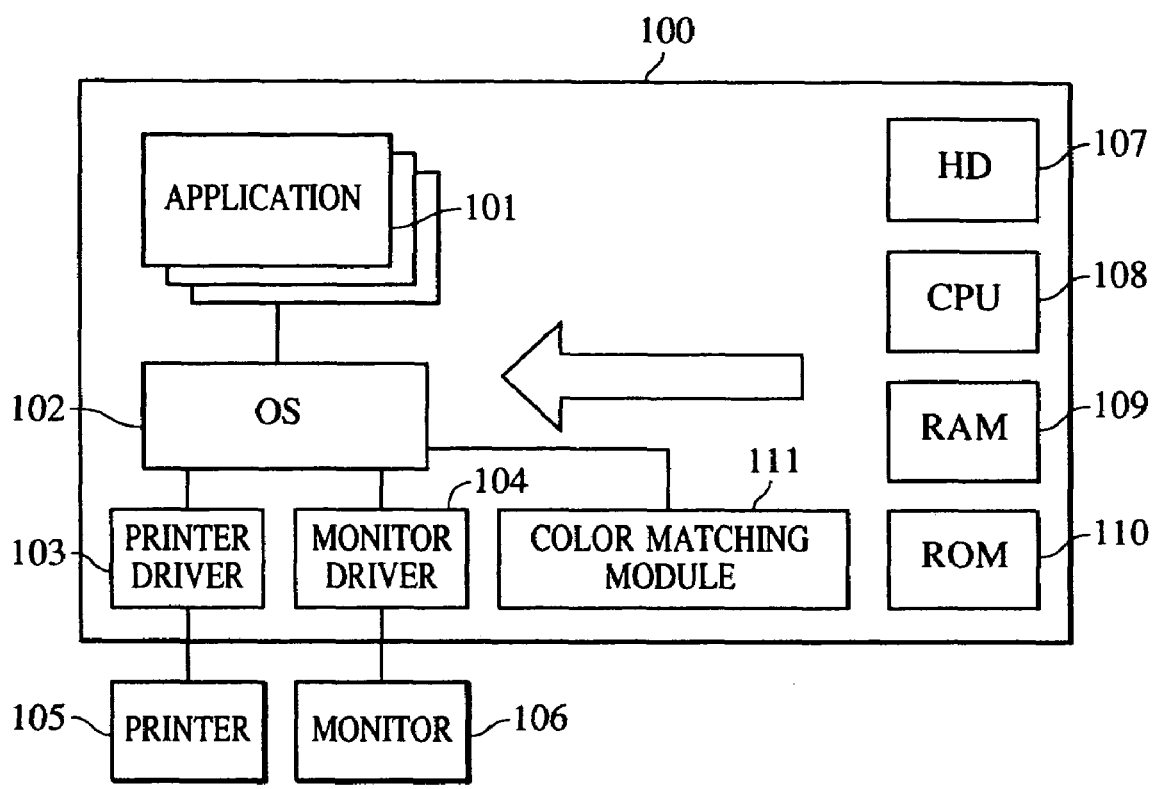
FIG. 1 is a block diagram illustrating the configuration of a system according to an embodiment of the present invention.

Referring to the block diagram illustrating a system of a first embodiment of the present invention shown in FIG. 1, a printer 105, such as an ink-jet printer, and a monitor 106 are connected to a host computer 100. The host computer 100 has application software 101, such as a word processor program, a spreadsheet program, an Internet browser, etc., a printer driver 103, a monitor driver 104, and a color matching module 111, all of which are implemented as software. The printer driver 103 processes a group of various drawing commands (image drawing commands, text drawing commands, and graphics drawing commands), indicating an output image, which are issued from various applications to an operating system (OS) 102, thereby creating print data. The monitor driver 104 processes a group of various drawing commands issued by the applications and displays the data on a monitor 106. The drivers 103 and 104 perform color-matching processing by using a color matching module 111 according to a request from the applications.

The host computer 100 has a central processing unit (CPU) 108, a hard disk drive (HD) 107, a random access memory (RAM) 109, a read only memory (ROM) 110, and so on, as various hardware devices for operating the above-mentioned software programs.

As the embodiment shown in FIG. 1, the following system may be used. In an IBM AT-compatible personal computer, which is widely used, Microsoft Windows 95 is used as an OS, and a certain application having a print function is installed, and a monitor and a printer are connected to the computer.

In the host computer 100, the application 101 creates output image data, such as text data classified as text, for example, characters, graphics data classified as graphics, for example, drawings, and image data classified as natural images, based on an image displayed on the monitor 106. When printing the output image data, the application 101 makes a print request to the OS 102, and issues a group of drawing commands consisting of graphics drawing commands indicating a graphics data portion, text drawing commands representing a text data portion, and image drawing commands indicating an image data portion. Upon receiving the print request from the application 101, the OS 102 issues the drawing command group to the printer driver 103 corresponding to the output printer. The printer driver 103 processes the print request and the drawing command group input from the OS 102, and generates print data of the form which can be printed by the printer 105 and transfers it to the printer 105. If the printer 105 is a raster printer, the printer driver 103 sequentially rasterizes the drawing commands from the OS 102 into an RGB 24-bit page memory. After rasterizing all the drawing commands, the printer driver 103 converts the content of the RGB 24-bit memory into a data format which can be printed by the printer 105, for example, into CMYK data, and transfers the data to the printer 105.

The printing processing executed by the printer driver 103 is now discussed. The printing processing performed by the printer driver 103 is largely divided into the following five processing items.

(1) Identifying Processing

By determining the type of drawing command of an object image input from the OS 102, the printer driver 103 identifies the type of object, i.e., a photographic image portion, a text portion, or a graphics portion.

(2) Image-correction Processing

Image-correction processing is conducted to correct the color balance disturbed by, for example, photographic conditions. A luminance histogram is created for a photographic image so as to determine the nonlinear color balance correction conditions. Then, nonlinear color balance correction is made on the photographic image, thereby appropriately correcting the color balance, the contrast, and the saturation of the photographic image.

Figure 11:
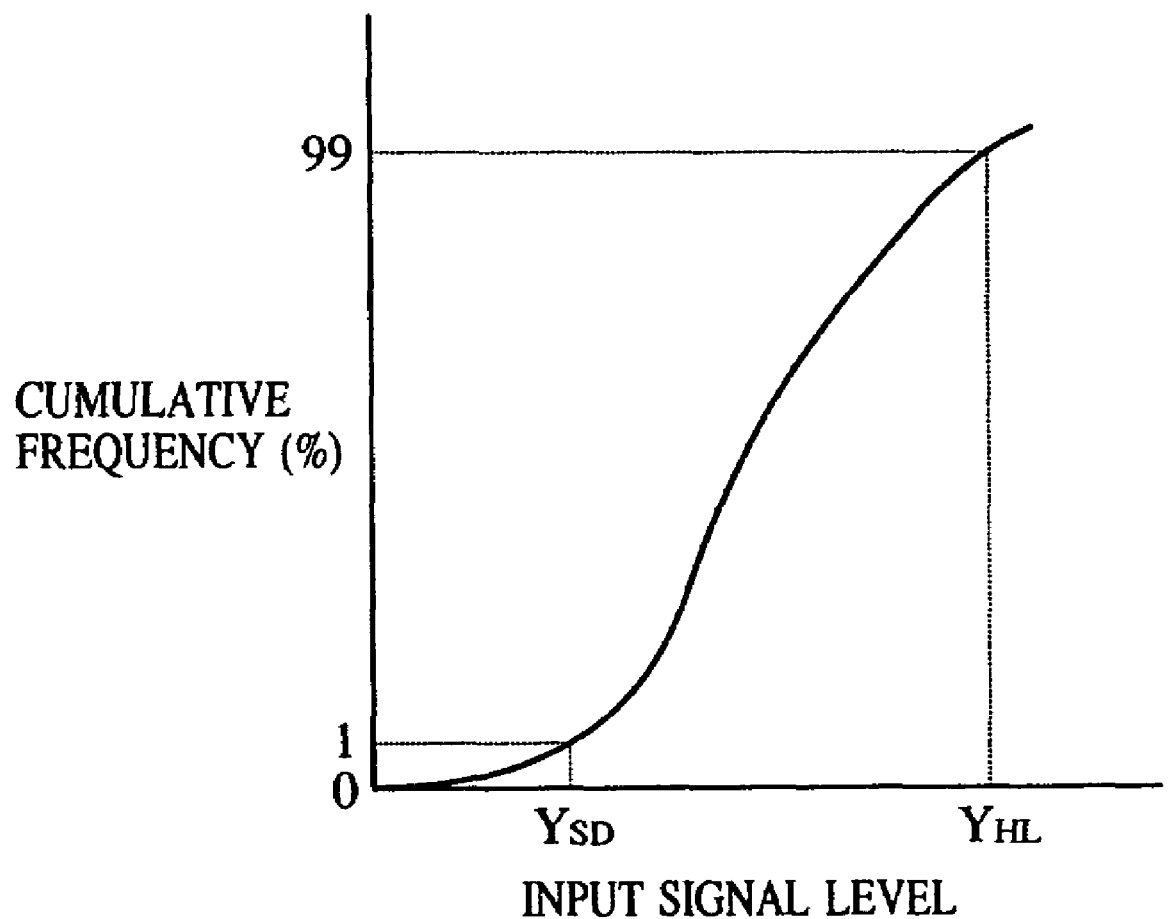
FIG. 11 illustrates a technique of determining the luminance of the highlight point/the shadow point.

The image-correction processing method is described below with reference to FIGS. 11 through 13. According to the image-correction processing performed in this embodiment, color balance correction, contrast correction, and saturation correction are made.

(Color Balance Correction)

A highlight point and a shadow point are determined from the image. To determine these points, a cumulative frequency histogram concerning brightness signals obtained by adding weighted RGB color signals is created. In the cumulative frequency histogram, the upper-limit value and the lower-limit value of the brightness signals corresponding to the predetermined cumulative frequency degrees are determined to be the highlight point and the shadow point, respectively.

The color difference signals (C1, C2) of the pixels having the highlight point and the shadow point of the image, which are expressed by the following equation:

$$C1 = R - Y$$

$$C2 = B - Y$$

are stored. The averages of the color difference signals of the plurality of pixels are determined to be the amount of color difference of the highlight point (C1(HL) and C2(HL)) and the amount of color difference of the shadow point (C1(SD) and C2(SD)), respectively.

Figure 12A:
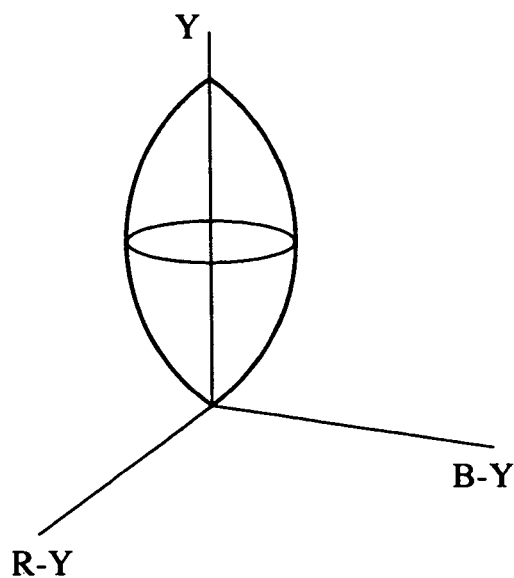
FIGS. 12A, 12B, and 12C illustrate the principle of color balance correction.
Figure 12B:
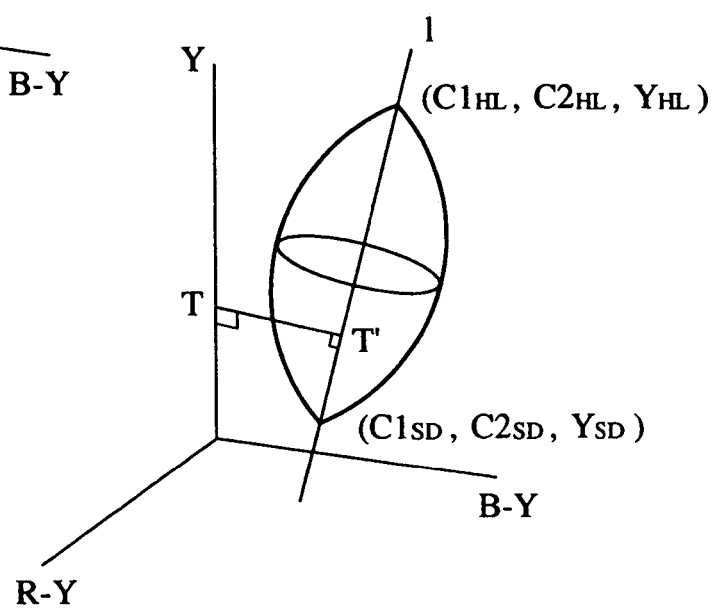

According to the amount of color difference of the highlight point and the amount of color difference of the shadow point, a color solid axis I (i.e., achromatic color axis) can be predicted, as illustrated in FIG. 12B.

According to the ideal color solid having a proper color balance, the color solid axis I matches the brightness axis Y, as shown in FIG. 12A.

Consequently, in the color balance correction performed in this embodiment, the rotation matrix and the amount of translation used for transforming the color solid axis I (defined by the highlight point and the shadow point) of the input object image into the brightness axis Y are determined, and then, the object image is corrected by using the determined rotation matrix and the amount of translation, thereby correcting the color balance of the input image. The rotation matrix can be easily obtained by the rotation axis and angle.

Figure 12C:
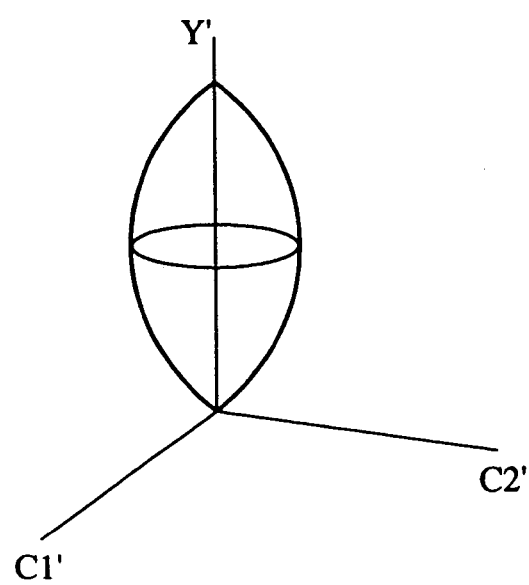

The coordinates (C1, C2, Y) of each pixel of the input image, as shown in FIG. 12B, is transformed in a three-dimensional color space into the coordinates (C1', C2', Y') shown in FIG. 12C. In this manner, the color balance of the image is corrected in a three-dimensional color space.

(Contrast and Saturation Adjustments)

The contrast and saturation are adjusted in the following manner. That is, it is simply determined whether the input image has been overexposed or underexposed, and based on the determined result, gamma correction is made on the luminance signal.

The contrast is adjusted by performing gamma correction in accordance with the exposure of the image, so as to adjust the luminance of the shadow point to "0" or its approximate value (for example, "10"), and to adjust the luminance of the highlight point to "255" or its approximate value (for example, "245"). An example of a technique of simply determining the overexposure or underexposure of the image and performing gamma correction in accordance with the result is given below.

The points connecting the shortest distance between the color solid axis I and the luminance axis Y, i.e., T and T', shown in FIG. 12B, are determined, which can be simply obtained by the geometric relationship.

Then, the contrast is adjusted so that T' matches T. More specifically, the point (T, T') is set to be a point of inflection, as illustrated in FIG. 13. Then, when Y' is smaller than T', Y' is corrected to Y" by the straight line a. When Y' is greater than T', Y' is corrected to Y" by the straight line b. If the axis of the image is parallel to the luminance axis, the existence of T does not make sense, in which case, Y' is corrected to Y" by using the straight line $I_2$.

The contrast correction by using T and T' is effective particularly for overexposed or underexposed images. The overexposed image originates from the fact that the whole image is affected by a bright portion, such as a sky image. In this case, an input apparatus, such as a digital camera, performs high-luminance color suppression to decrease the saturation of the high luminance portion.

Figure 14A:
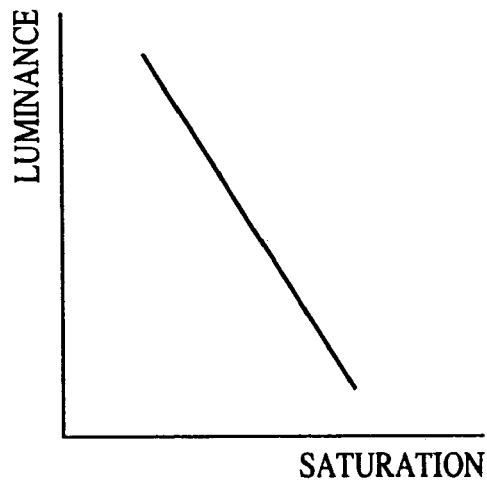
FIG. 14A through 14D illustrate the characteristics of overexposure and underexposure as viewed from the luminance-saturation plane.

That is, the color solid axis of the image may be represented, as shown in FIG. 14A, in a two-dimensional plane having the saturation on the horizontal axis and the luminance on the vertical axis. The color closest to the achromatic color appears at the portion corresponding to the highest luminance.

Figure 14B:
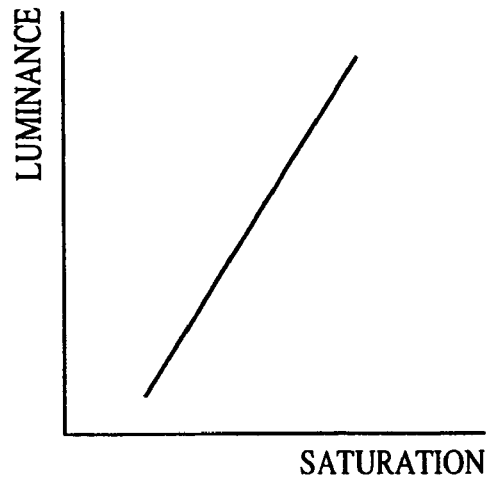

Conversely, since low-luminance color suppression is conducted on underexposed images, the resultant color solid axis can be represented, as shown in FIG. 14B. Thus, it can be easily determined whether the image is overexposed or underexposed according to the values of T and T'.

Figure 14C:
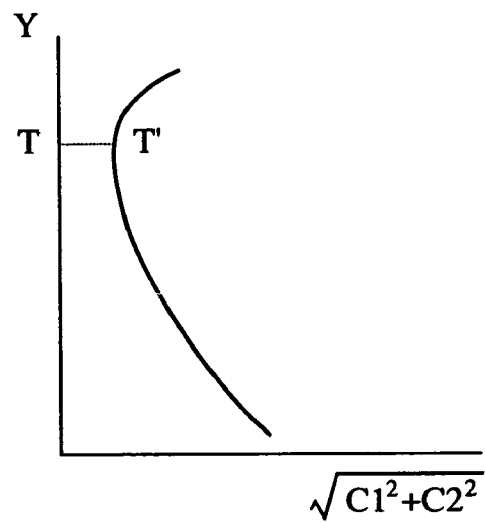
Figure 14D:
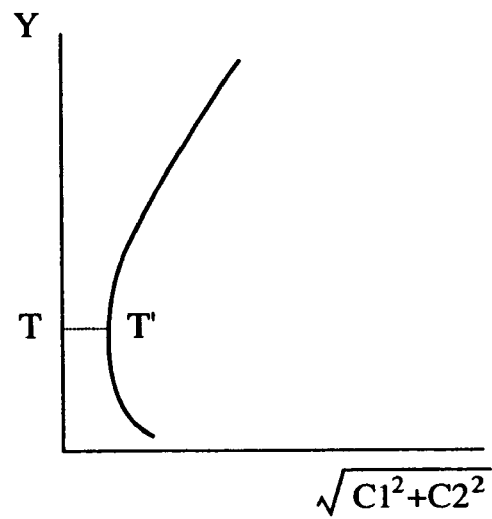

In an actual image, when the luminance axis of the color solid is represented by the luminance-and-saturation plane, the overexposed image may be indicated, as illustrated in FIG. 14C, and the underexposed image may be indicated, as shown in FIG. 14D.

It is now assumed that the actual color solid deviates from the ideal color solid due to a reason, such as a photographic condition or an influence caused by analog-to-digital conversion. Then, it can be considered that the distance between the positions T and T' has the smallest deviation. Accordingly, in this embodiment, T' is corrected to T, thereby simply correcting the gray scale, i.e., the overall brightness.

The saturation adjustments can be performed very easily. For example, to increase the saturation by 20%, the processing expressed by:

$$C1''=1.2 \times C1'$$

$$C2''=1.2 \times C2'$$

may be performed to adjust the saturation. This is because the saturation is defined by the following equation.

$$\text{Saturation}=\sqrt{C1^2+C2^2}$$

The degree of saturation adjustment may be specified according to an instruction set by the user through a user interface of a printer driver.

As discussed above, the image-correction processing in this embodiment is performed in the luminance color difference space. Thus, the correction parameters employed in this image-correction processing are represented by a three-dimensional look-up table (LUT), which is created based on a parameter 1 for converting an input RGB signal into a luminance color difference signal, a parameter 2 for performing color balance correction, contrast correction, and saturation correction in a luminance color difference space, and a parameter 3 for converting the luminance color difference signal into the RGB signal.

Figure 13:
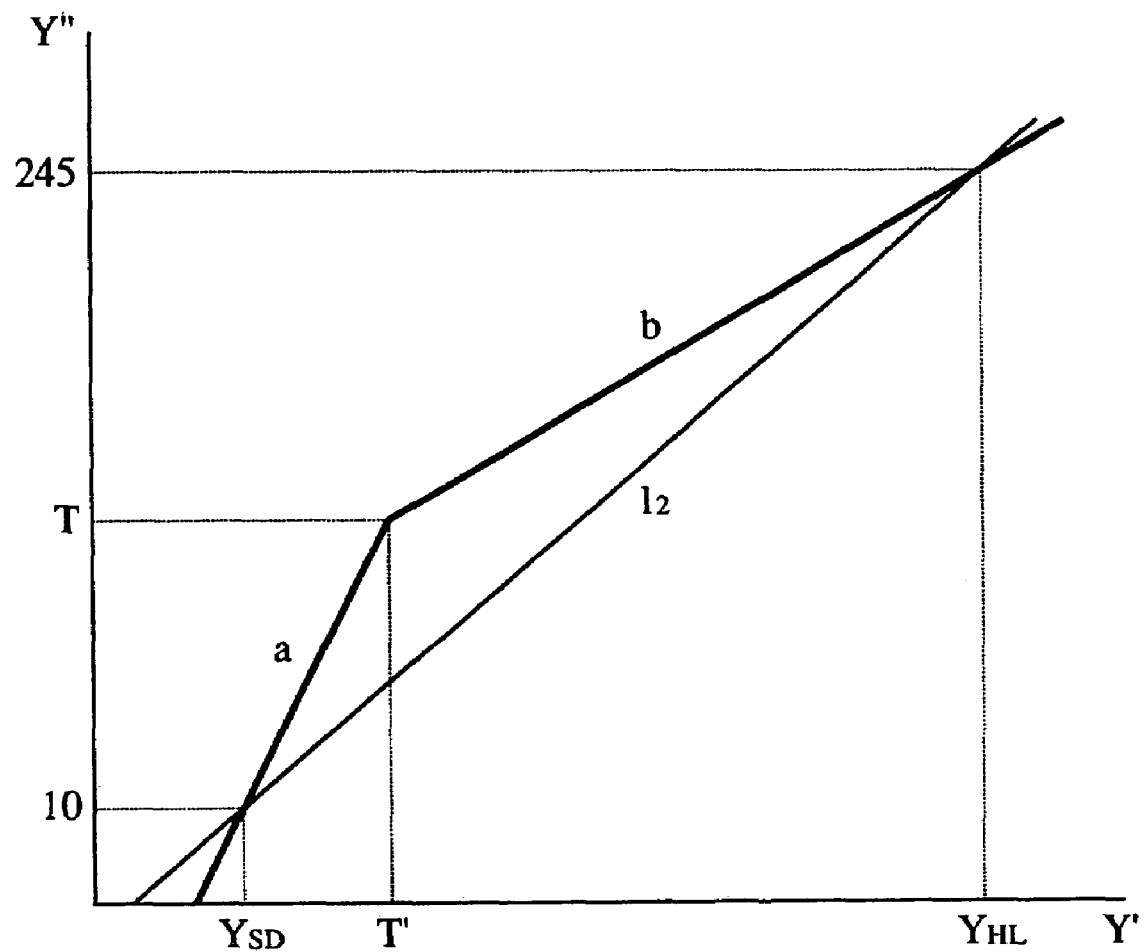
FIG. 13 illustrates the contrast adjustment.

The parameter 2 is formed of a table for transforming a rotation matrix discussed in the color balance correction and the luminance components shown in FIG. 13 described in the contrast correction, and a coefficient for correcting the color difference signal whose color balance has been corrected, as discussed in the saturation correction. The table for transforming the rotation matrix and the luminance components is obtained based on a histogram of luminance components of the object image.

(3) Color-matching Processing

The color matching module 111 performs color-matching processing by using a source profile based on input color information contained in a drawing command and on a printer profile corresponding to the printer, thereby converting the input color information into printer color information which is determined by the printer.

As the input profile, a profile added to the header of the function of the drawing command is used. If the profile is not added to the header, a profile corresponding to the system monitor set in the host computer 100 may be used, or a profile set by the printer driver 103 may be used.

The color reproduction range of the printer is narrower than that of the monitor. Accordingly, the color represented by the input color information is not always faithfully reproduced by the printer. Thus, the color-matching processing is performed by employing a color matching method in accordance with the type of image indicated by the input color information so that the input color information can be converted into the printer color information representing the color within the color reproduction range.

The color matching method includes three modes, such as a perceptual mode, a saturation mode, and colorimetric mode.

The perceptual mode is best used for photographs. While giving priority to the color shade and the gray scale of the image, the overall image is mapped within the color reproduction range of the printer so that the gray scale levels outside the color reproduction range of the printer can be stored.

The saturation mode is appropriate for graphics. While giving priority to the reproduction of saturated colors contained in the image, the overall image is mapped within the color reproduction range so that a greatest possible number of color saturation components outside the color reproduction range of the printer can be stored.

The calorimetric mode is suitable for text images, such as characters and logos produced by designating a specific color by a user through an application. In this mode, by giving priority to the faithful reproduction of a specific color, the overall image is mapped so that the color difference ($\Delta E$) can be minimized.

(4) Rasterizing Processing

RGB raster data according to the resolution of the printer is generated from the drawing command based on the color information in which image correction and color-matching processing have been performed. The RGB raster data is then sequentially rasterized into the RGB 24-bit page memory.

(5) Printer Color Processing

Luminance/density conversion processing, masking processing, gamma processing, and N-level quantizing processing are performed on the RGB raster data, thereby converting the RGB raster data into CMYK data in accordance with CMYK recording toners used in the printer.

The flow of the processing executed by the printer driver 103 according to this embodiment is discussed below with reference to FIGS. 2 and 3.

The printer driver 103 requests the application 101 or the OS 102 to send print data twice (a group of drawing commands) forming a print page image. In response to the two requests made by the printer driver 103, the application 101 issues the whole set of drawing command groups required for outputting the whole page.

Figure 2:
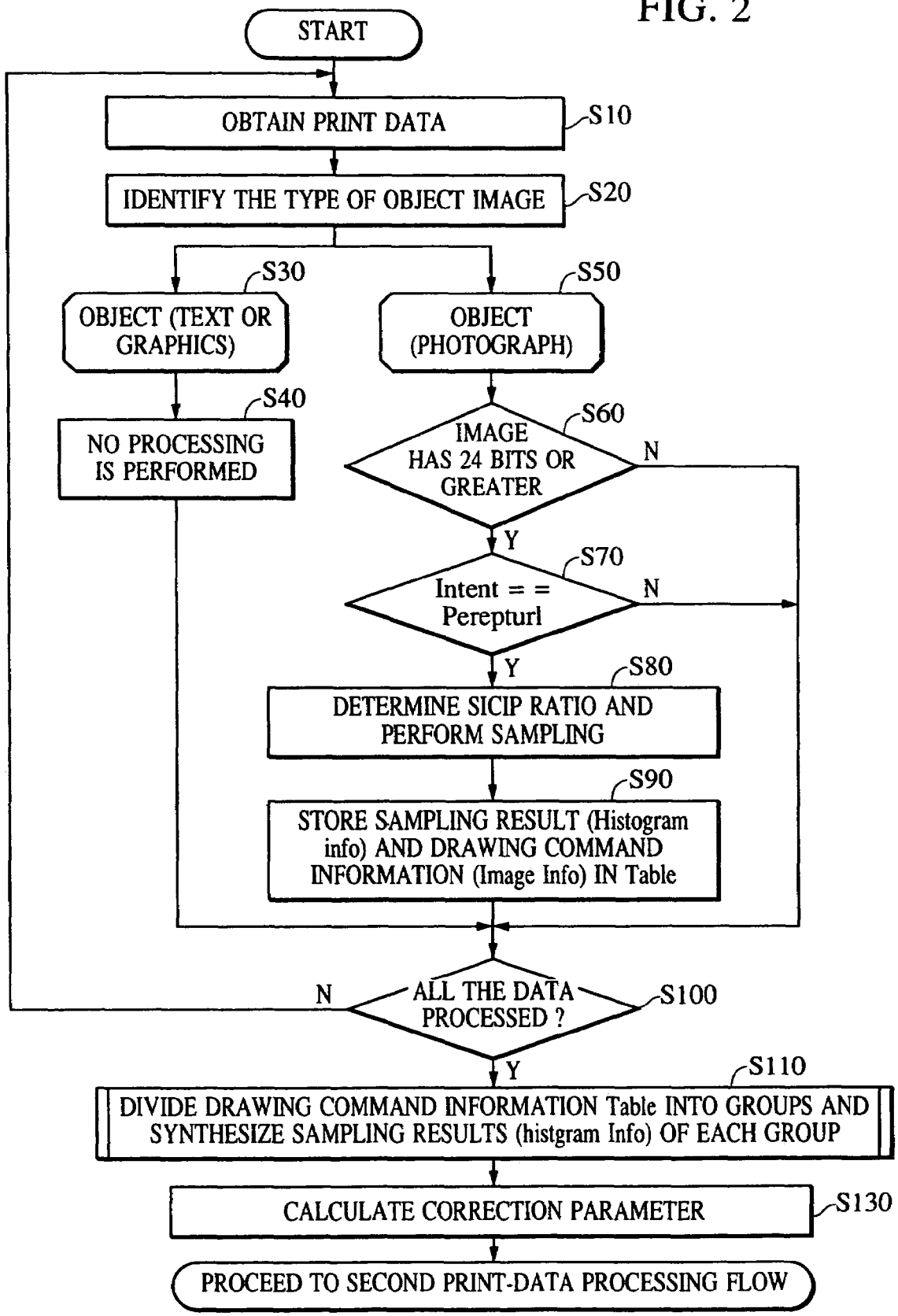
FIG. 2 is a flow chart illustrating a first print-data processing flow.
Figure 3:
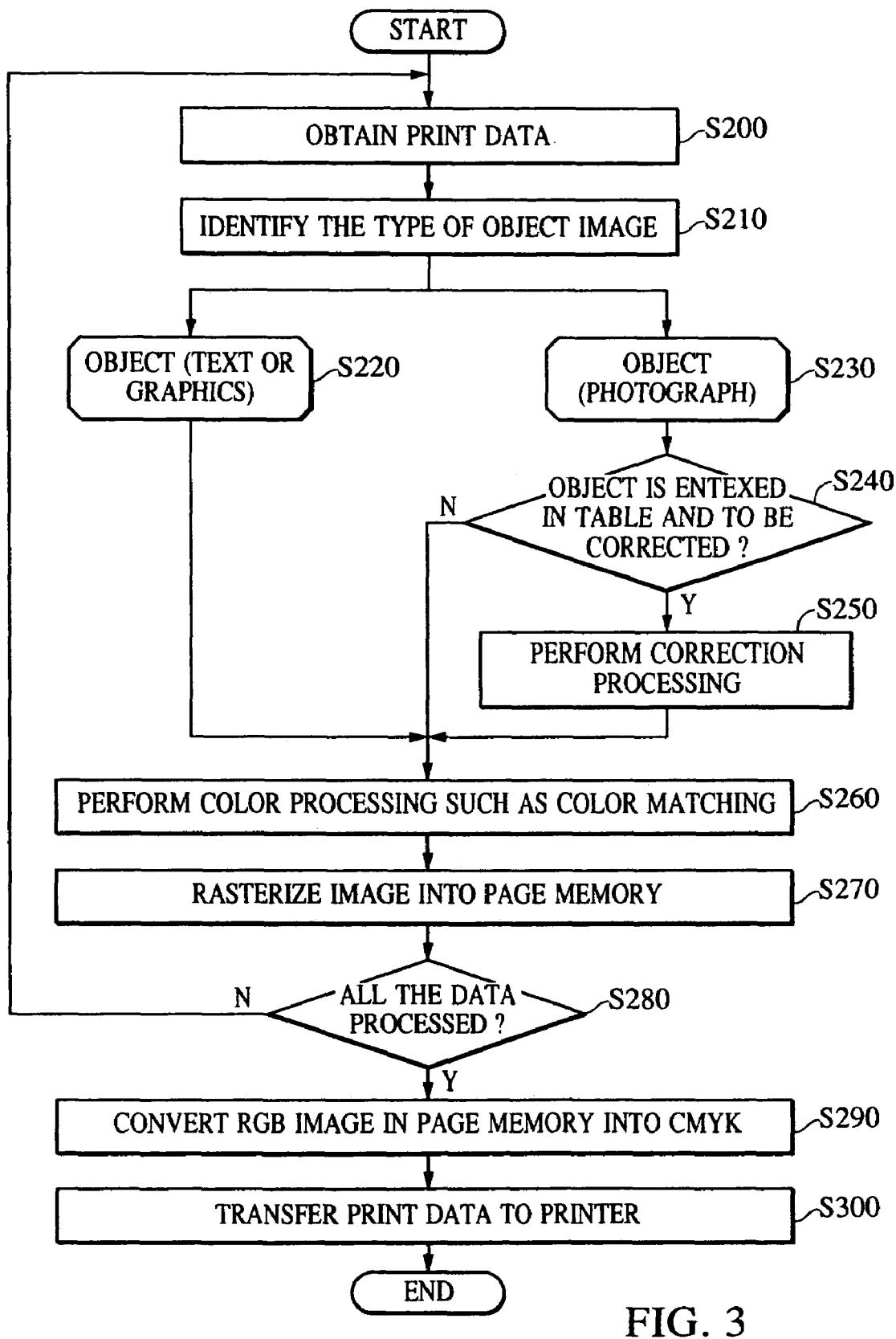
FIG. 3 is a flow chart illustrating a second print-data processing flow.

FIG. 2 is a flow chart illustrating the first print-data processing, and FIG. 3 is a flow chart illustrating the second print-data processing.

In the first print-data processing, the print data is analyzed to collect information required for image-correction processing, thereby preparing the execution of image-correction processing. In the second print-data processing, the image-correction processing is performed on only part of the image drawing commands which has been determined to need image-correction processing based on the preparation of the execution of the image-correction processing. Additionally, the color matching correction processing is conducted. The resultant drawing commands are then rasterized into the page memory so as to create a print image, which is then transferred to the printer 105.

The first print-data processing illustrated in FIG. 2 is discussed below. In step S10, the drawing commands are received one-by-one from the application 101 or the OS 102. In step S20, the content of the drawing command is analyzed to identify the type of object image represented by the drawing command. If it is found in step S20 that the drawing command is other than the image drawing command, that is, a drawing command concerning text or graphics, it is determined that the type of object image is not a photograph, and the process proceeds to step S30. In step S40, no processing is executed in the first print-data processing, and the process proceeds to step S100.

If it is determined in step S20 that the print data concerns an image drawing command, the process proceeds to step S50. Since the image-correction processing performed in this embodiment is to correct the color balance disturbed by an influence of photographic conditions, the image to be corrected is a photographic image. Generally, photographic images are 24-bit RGB images, and images having bits smaller than 24 bits (for example, an 8-bit palette) are not usually photographs, which are thus unsuitable for the image correction performed in this embodiment. Accordingly, the header of the function of the image drawing command is checked in step S60, and only when the image has 24 bits or greater, the process proceeds to step S70. If the image has less than 24 bits, it is determined that the image is not appropriate for correction, and the process proceeds to step S100.

In step S70, the header of the function of the image drawing command is checked. If the "Intent" of the perceptual mode, which is best used for natural image photographs, is specified, the value of the "Intent" is checked. Then, it is determined that the image is to be corrected, and the process proceeds to step S80. However, if it is found in step S70 that the colorimetric mode or the saturation mode is specified, even when the image has 24 bits or greater, the image may be other than a natural image photograph, for example, a company logo or a joint photographic coding experts group (JPEG) banner image of an Internet home page. Accordingly, it is determined that the image is not to be corrected, and the process proceeds to step S100.

Subsequently, in step S80, the content of the object image represented by the image drawing command is sampled. According to the correction logic used in this embodiment, the outline of the luminance histogram of the object image suffices. For a certain size of object image, all the pixels do not have to be sampled, but may be sampled while being skipped to a certain degree, resulting in a similar quality. Thus, in step S80, the sampling skip ratio is determined from the size of the object image, and skip sampling is performed based on the determined sampling skip ratio, thereby increasing the processing rate.

For example, if the size of the object image is 100×100 pixels, the luminance histogram is created by sampling all the pixels. If, however, the size of the object image is 200×200 pixels, sampling is performed on every other line, and also, sampling is performed on every other pixel of every other line.

For example, when the width and the height of the object image are indicated by W and H, respectively, and when the skip ratios of the column and the row of the matrix are indicated by SkipX and SkipY, respectively, the skip ratios can be obtained by the following equations.

$$\text{Skip}X=(W/100)+1$$

$$\text{Skip}Y=(H/100)+1$$

The approach to determining the skip ratios is not limited to the above calculations, and the values suitable for the correction logic used in this embodiment may be applied.

Subsequently, in step S90, one entry is created in the table shown in FIG. 4 of the RAM 109, and the sampling result generated in step S80 and the drawing command information contained in the image drawing command are stored in the entry of the table.

An example of the content of the drawing command information ImageInfo stored in the table is shown in FIG. 5. The content of ImageInfo is formed of the drawing positions X and Y, the width W, the height H of the object image represented by the image drawing command, the bits of the object image, the Source Color Space information specified by Color Management System (CMS), and the Color Matching Intent specified value designated by the CMS.

Figure 6:
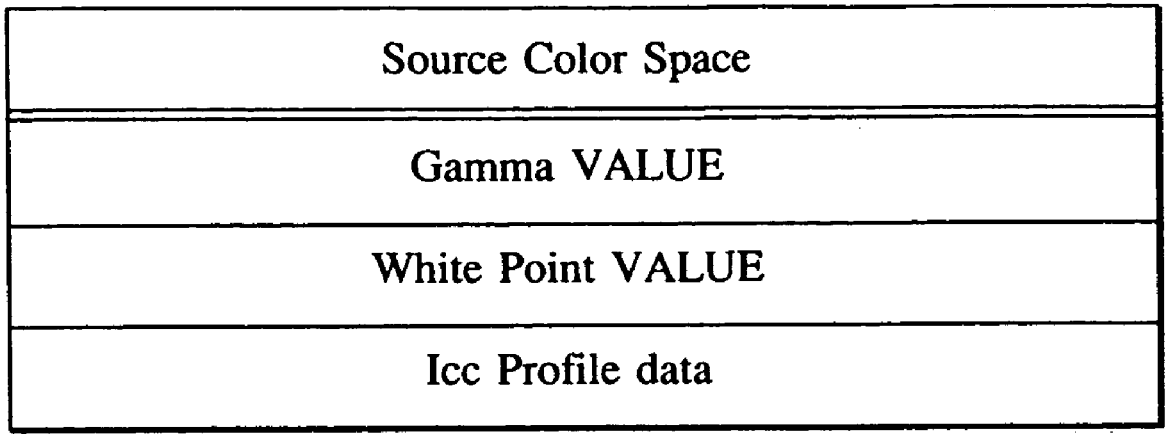
FIG. 6 illustrates an example of the configuration of Source Color Space information.
Figure 7:
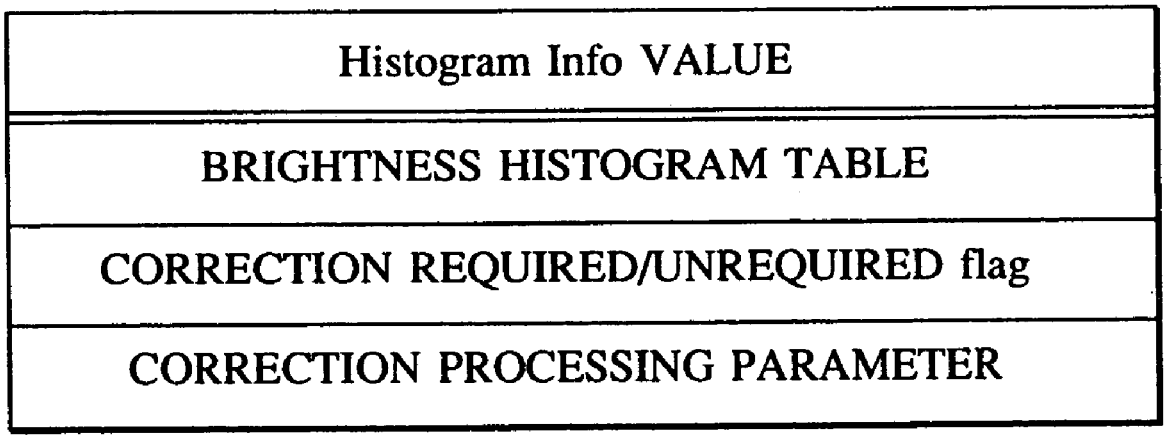
FIG. 7 illustrates an example of the configuration of a Histogram Info value.

An example of the content of the Source Color Space information included in ImageInfo is shown in FIG. 6. The Source Color Space information is an ICC profile for storing various information, such as a gamma value and a white point value predicted by the RGB 24-bit value of the object image, and characteristics upon which the RGB 24-bit value is dependent.

Until all the drawing commands are subjected to the above-described processing in step S100, the processing from step S10 to step S100 is repeated. Upon completion of the processing of all the print data, the process proceeds to step S110.

When the flow reaches step S110, entries having the same number as the image drawing commands indicating the object images to be corrected included in the output page have been created in the table shown in FIG. 4. In each entry, the drawing command information ImageInfo and the sampling information HistInfo of each object are included. In step S110, the drawing image information ImageInfo in all the entries are compared, and are classified as groups, each group consisting of a plurality of image drawing commands divided from a single original object by the application 101.

Figure 8:
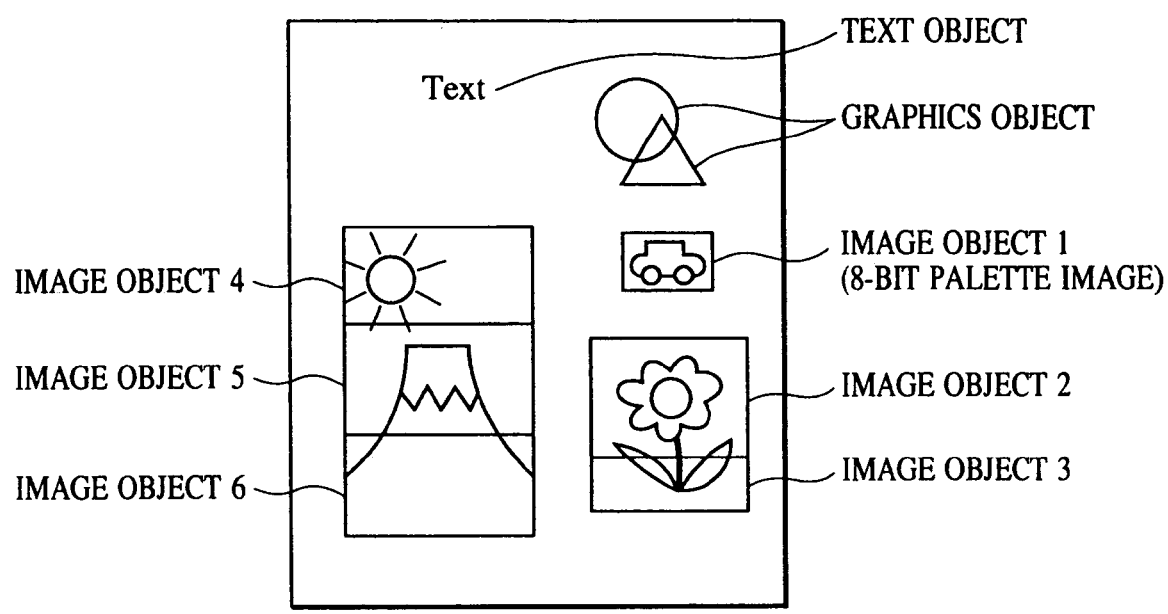
FIG. 8 illustrates an example of an input image.

An example of a document created by the application 101 is shown in FIG. 8. In this example, the whole page is formed of one text object, two graphics objects, and six image objects.

Among the above objects, the text object and the graphics objects, whose types have been determined in step S20, are branched to step S30, and thus, no entries are created in the table of FIG. 4. Since the image object 1 shown in FIG. 8 is an 8-bit palette image, the outcome of step S60 for determining whether the image object has 24 bits or greater is no, and no entries are generated in the table. The image objects 2, 3, 4, 5, and 6, i.e., five image drawing commands, proceed to step S80 in FIG. 2, and entries are generated in the table. That is, concerning the page shown in FIG. 8, five entries have been created in the table when the flow reaches step S110 of FIG. 2.

The user of the application document shown in FIG. 8 has pasted three images when creating the document, i.e., one of the images is the image object 1, one is an object which has been internally divided into the image objects 2 and 3 by the application 101, and one is an object which has been internally divided into the image objects 4, 5, and 6 by the application 101.

In some cases, an object image pasted by an application is internally treated as a single object image as it is, and also issues a single image drawing command when the image is output. In comparatively high-end applications, however, which aim to optimize the efficiency in using the memory and the processing rate, a large image may be internally divided, as illustrated in FIG. 8, into a plurality of image objects, which may be processed by a plurality of image drawing commands. This type of processing is often executed in, for example, the Adobe PhotoShop v4.0 application.

In this embodiment, a histogram is created for each of the image drawing commands to be corrected. Accordingly, when the process reaches step S110 of FIG. 2, different histograms have been created for the parts shown in FIG. 8 internally divided from a single original image by the application.

For example, in the photograph portion, landscape, shown in FIG. 8, the image object 4 is often a bright sky, while the image object 6 is often a dark ground. Thus, the correction parameters derived from the different histograms are inevitably different. Consequently, image correction is performed on the individual parts by using different correction parameters obtained from the histograms. As a result, when a single original image is output, there may be a slight difference of the color tone at the interfaces of the parts of the single image.

In terms of the quality of the output image, it is not preferable that corrections are performed by using different correction parameters on the individual parts internally divided from a single original image by the application.

In order to avoid this situation, the image-correction processing should be modified as follows. It is first recognized that the image objects 4, 5, and 6 are originally a single object image and are classified as the same group forming the single object image. Then, the histograms of the image objects 4, 5, and 6 in the same group are synthesized, and the correction parameter applicable to the whole group is calculated from the synthesized histogram. Image-correction processing is then conducted on the whole group by using the single parameter.

Various techniques can be considered to group the entries stored in the table in step S110.

As a simple example of the techniques, the drawing command information ImageInfo values of all the entries in the table are compared, and the entries determined to be adjacent to each other from the drawing positional information X, Y, W, and H are classified as the same group. For example, concerning the image objects 4 and 5 shown in FIG. 8, the X and W values of the image object 4 are equal to those of the image object 5, and the Y and H values of the image object 4 are equal to those of the image object 5. It is thus demonstrated that the image objects 4 and 5 are vertically adjacent to each other. Similarly, it can be confirmed that the image objects 5 and 6 are vertically adjacent to each other. As a result, it can be determined that the image objects 4, 5, and 6 visually form a single image as the same group.

According to the above determination result, the content of the table having the established group IDs is shown in FIG. 9. Indices 0 and 1 correspond to the image objects 2 and 3, respectively, illustrated in FIG. 8, and the same group ID=0 is set for both indices 0 and 1. Indices 2, 3, and 4 correspond to the image objects 4, 5, and 6, respectively, shown in FIG. 8, and the same group ID=1 is set for all the indices 2, 3, and 4. FIG. 9 reveals that there are five entries in the table, which can be classified as two groups.

According to another approach to grouping the entries of the table, not only the consistencies in the image drawing positions, but also the consistencies in the bits of ImageInfo and/or the specified Source Color-Space value may be considered, thereby achieving more precise grouping.

For example, it is now assumed that the application user arranges the layout of the document by placing two objects having the same size vertically adjacent to each other by chance. In this case, if the image objects are classified as the same group merely by the drawing positional information, the two different images are determined to be a single image, and the histograms are inappropriately synthesized, thereby failing to obtain the suitable correction parameter. In contrast, if the two object images have been obtained by different input devices, for example, a digital camera of company A and a scanner of company B, the corresponding different Source Color Space values are designated for the respective images. Thus, by checking whether the designated Source Color Space of one image coincides with that of the other image, the two images can be recognized as independent images.

As another approach to confirming whether image objects can be classified as the same group, a printer driver may be provided with, as a database, a list of names of the applications that perform image division. During a printing operation, the printer driver may extract the name of the application which is performing a printing operation, and may not group the images obtained by an application that does not perform image division.

As still another approach, the following interface may be provided. A print image obtained by dividing image objects may be displayed on a monitor as a preview image and checked by a user. If the image objects have been erroneously grouped, the group IDs of the individual image objects can be explicitly specified manually by the user. For outputting the print image to the preview screen, the application "ColorAdvisor" is available to enable the user to preview the image to be output to a commercially available product, Canon BJ Printer Driver, and to change the color of the text portion.

Divided image objects obtained by some applications may not be directly placed adjacent to each other, but may be located with overlapping portions. To cope with this case, it may be determined from the drawing positional information of the ImageInfo value that images having overlapping portions belong to the same group.

The techniques of grouping the divided image objects may be changed according to the application used. Any technique is applicable insofar as the same group ID can be assigned to the entries of the parts divided from a single image.

Figure 10:
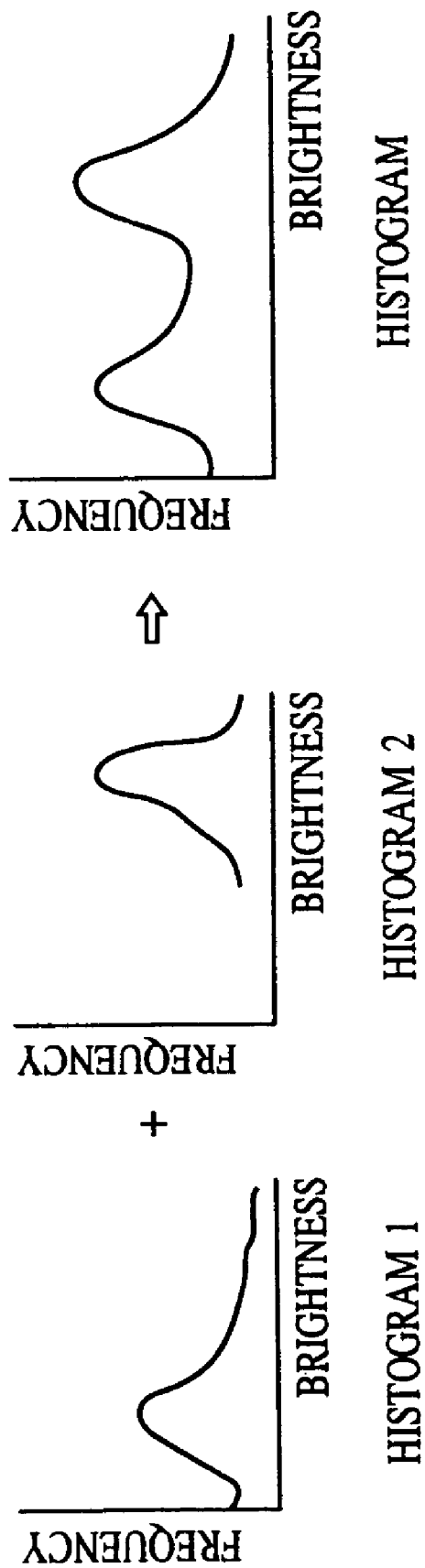
FIG. 10 illustrates a synthesizing operation of histograms.

Upon completion of grouping the divided image objects by using, for example, the group IDs shown in FIG. 9, the sampling information HistInfo having the same ID are synthesized in step S110. In this synthesizing operation, the frequency information items with respect to the same luminance are simply added. For example, when the entries of the indices 0 and 1 having the group ID=0 have Histogram 1 and Histogram 2, respectively, illustrated in FIG. 10 as the luminance histogram of HistInfo, the two histograms are synthesized to obtain Histogram 0 (HistInfo0) shown in FIG. 10. As a consequence, the indices 0 and 1 of the table are synthesized to share the same sampling information HistInfo0, as shown in FIG. 9.

Likewise, the three histograms of the indices 2, 3, and 4 are synthesized to share the same sampling information HistInfo1, as illustrated in FIG. 9.

Subsequently, in step S130, the correction parameter used in the aforementioned image-correction processing is calculated from the luminance histogram of the grouped image, and is stored in the sampling information HistInfo of the table.

The first print-data processing flow has thus been completed, and the printer driver 103 makes the second request to the OS 102 or the application 101 to send the print data.

The second print-data processing flow is shown in FIG. 3. As in the case of the first print-data processing flow, in step S200, print data (drawing commands) is received one-by-one from the application 101 or the OS 102. In step S210, the content of the drawing command is analyzed. If the drawing command is other than an image drawing command, i.e., the drawing command concerns text or graphics, the process proceeds to step S220 and further to step S260. In step S260, color-matching processing is performed according to the type of object, and in step S270, the resulting image is rasterized into a page memory.

If it is found in step S210 that the drawing command is an image drawing command, the process proceeds to step S230. A determination is then made in step S240 whether the image drawing command concerns an object entered in the table. The above determination can be made by comparing the drawing positions, the bits of the object image, the ColorSpace information, and the Intent value with the information stored in the ImageInfo value of the table and by searching for an object having the same values as those of the image drawing command. If there is no entry in the table corresponding to the image drawing command, the process proceeds to step S260 in which color-matching processing is performed. The resulting image is then rasterized into the page memory in step S270.

If it is found in step S240 that there is an entry in the table corresponding to the image drawing command, the process proceeds to step S250. In step S250, image correction is conducted on the image object represented by the image drawing command by using the correction parameter stored in HistInfo of the entry whose values of ImageInfo are identical to those of the image drawing command.

In step S260, perceptual-mode color-matching processing, which is best used for photographs, is conducted on the image object corrected in step S250, and the resulting image is rasterized into the page memory in step S270.

It is then determined in step S280 whether all the print data has been processed. The processing from step S200 to step S280 is repeated until the processing of all the print data of the whole page is completed.

If the outcome of step S280 is yes, the process proceeds to step S290 in which printer color processing is executed on the print image data created in the page memory, thereby converting it to an image in the form which can be output by the printer 105.

In step S300, the print image converted in step S290 is processed into print data in the form which can be processed by the printer 105 and is then transferred. Generally, in a raster printer, data compression is performed on every other raster line and is packed into a simple printer command.

Second Embodiment

In the first embodiment, color-matching processing, which is part of print processing, is performed by the printer driver 103 as one type of color processing. In the second embodiment, the application 101, which performs color editing, conducts color-matching processing on an input image by using the color matching module 111.

If an input image has undergone color-matching processing, it can be assumed the user has completed color correction on the image by using the application. Thus, it is not suitable that image-correction processing and color-matching processing be performed in the printer 105 because it may dangerously disturb the color correction made by the user.

Accordingly, in this embodiment, if information indicating completion of color-matching processing is contained in the header of the function of the drawing command representing the image object input by the printer driver 103, the image-correction processing and the color-matching processing discussed in the first embodiment are not performed on the image object.

According to the second embodiment, the color processing of the printer driver 103 can be controlled based on the color processing conducted by the application 101, thereby achieving a high-quality image.

EXAMPLES OF MODIFICATIONS

In the foregoing embodiments, the image-correction processing (color balance correction, contrast correction, and saturation correction) based on histograms is performed. The sampling technique and the grouping technique employed in the above-described embodiments may be used in another type of image processing.

For example, although in the foregoing embodiments the color-matching processing is performed by using the color matching method stored in a profile, the color matching conditions may be dynamically created according to the input image, as proposed in Japanese Patent Laid-Open No. 4-260121. The sampling technique and the grouping technique employed in the foregoing embodiments are dynamically applied when setting the color matching method in accordance with the input image, thereby efficiently obtaining good color matching conditions.

In the foregoing embodiments, the printer driver 103 makes requests twice to the application 101 or the OS 102 to send print data. In the present invention, however, the number of requests is not limited to two. For example, the input drawing command obtained by the first print-data request may be stored, thereby eliminating the need for a second print-data request.

Although in the foregoing embodiments image-correction processing is performed in the printer driver 103, it may be executed in the monitor driver 104. Alternatively, the image-correction processing may be conducted by using a color correction application.

In the foregoing embodiments, a raster printer driver is used as the printer driver 103, a printer driver compatible with a page description language, such as PostScript, may be used.

The present invention may be applied to a system formed of a plurality of apparatuses (for example, a host computer, an interface device, a reader, a printer, etc.) or to a single apparatus (for example, a copying machine or a facsimile machine).

Although in the foregoing embodiments brightness histograms are created, another component indicating the lightness, such as luminance, may be used to generate histograms.

In the color-matching processing in the aforementioned embodiments, the profile is added to the header of the function of the drawing command. However, the header of the function of the drawing command may merely contain information for reading the profile stored in the memory.

The user may manually instruct, through a user interface of the printer driver, whether the above-described image-correction processing should be executed.

In another embodiment of the present invention, software program code for implementing the above-described functions may be supplied to a computer (a CPU or an MPU) within the system or within the apparatus connected to the above-described devices. Then, the aforementioned devices may be operated in accordance with the program stored in the computer of the system or the apparatus, so that the above-described functions can be implemented.

In this case, program code itself and means for supplying the program code to the computer (e.g., a storage medium for storing the program code therein) constitute the present invention.

Examples of the storage medium for storing the program code include a floppy disk, a hard disk, an optical disc, a magneto-optical disk, a compact disc-read only memory (CD-ROM), a magnetic tape, a non-volatile memory card, and a ROM.

The function of the foregoing embodiment can be implemented not only by running the program code read by the computer, but also by executing the processing by, for example, an operating system (OS) or another application software program running in the computer in cooperation with the program code.

The present invention may also be implemented by writing the program code read from the storage medium into a memory provided on a feature expansion board inserted into a computer or a feature expansion unit connected to the computer. Then, a CPU provided on the feature expansion board or the feature expansion unit partially or wholly executes the processing based on the instructions of the program code, thereby implementing the above-described functions.

As stated above, the description was given based on the preferable embodiments, however, the present invention is not limited to the foregoing embodiments, but many modifications and variations are possible within the spirit and scope of the appended claims of the invention.

What is claimed is:

1. A method for performing image processing, said method comprising the steps of:
   inputting image data corresponding to plural image objects;
   grouping the plural image objects based on the image data, a set of grouped plural image objects being divided from a single original image object;
   detecting a characteristic of the single original image object based on the image data corresponding to the grouped plural image objects;
   setting an image processing condition for the grouped plural image objects based on the detected characteristic; and
   performing image processing on the image data corresponding to the grouped plural image objects using the image processing condition set in said setting step.

2. A method according to claim 1, wherein the image data includes object information of the plural image objects.

3. A method according to claim 2, wherein the object information includes location information and, in said grouping step, adjacent objects are detected based on the location information.

4. A method according to claim 3, wherein the adjacent objects at least partially overlap.

5. A method according to claim 2, wherein the object information includes bit numbers of the image data, and in said grouping step, the plural image objects having the same bit numbers are detected.

6. A method according to claim 2, wherein the object information includes Intent value of the plural image objects.

7. A method according to claim 2, wherein the characteristic includes a color distribution of the grouped objects, and in said setting step, the image processing condition is set to a color balance correction condition based on a detected highlight point of the color distribution.

8. A method according to claim 7, further comprising the step of synthesizing the color distribution of each of the plural image objects.

9. A method according to claim 1, further comprising the steps of:
- inputting a drawing command corresponding to the image objects;
- distinguishing types of the image objects based on the drawing command; and
- controlling the image processing based on a result obtained in said distinguishing step.

10. An apparatus for performing image processing, said apparatus comprising:
- an input section adapted to accept image data corresponding to plural image objects;
- a grouping section adapted to group the plural image objects based on the image data, a set of grouped plural image objects being divided from a single original image object;
- a detecting section adapted to detect a characteristic of the single original image object based on the image data corresponding to the grouped plural image objects;
- a condition setting section adapted to set an image processing condition for the grouped plural image objects based on the detected characteristic; and
- a processor adapted to perform image processing on the image data corresponding to the grouped plural image objects using the image processing condition set in said condition setting section.

11. An apparatus according to claim 10, wherein the image data includes object information of the plural image objects.

12. An apparatus according to claim 11, wherein the object information includes location information and, in said grouping section, adjacent objects are detected based on the location information.

13. An apparatus according to claim 12, wherein the adjacent objects at least partially overlap.

14. An apparatus according to claim 11, wherein the object information includes bit numbers of the image data, and in said grouping section, the plural image objects having the same bit numbers are detected.

15. An apparatus according to claim 10, wherein the object information includes Intent value of the plural image objects.

16. An apparatus according to claim 11, wherein the characteristic includes a color distribution of the grouped objects, and in said setting section, the image processing condition is set to a color balance correction condition based on a detected highlight point of the color distribution.

17. An apparatus according to claim 16, further comprising:
- a command input section adapted to accept a drawing command corresponding to the image objects;
- a distinguishing section adapted to distinguish types of the image objects based on the drawing command; and
- a controlling section adapted to control the image processing based on a result obtained in said distinguishing section.

18. A computer readable medium storing a computer readable program for performing image processing, the program comprising the steps of:
- inputting image data corresponding to plural image objects;
- grouping the plural image objects based on the image data, a set of grouped plural image objects being divided from a single original image object;
- detecting a characteristic of the single original image object based on the image data corresponding to the grouped plural image objects;
- setting an image processing condition for the grouped plural image objects based on the detected characteristic; and
- performing image processing on the image data corresponding to the grouped plural image objects using said image processing condition set in said setting step.

19. A computer readable medium according to claim 18, wherein the object information includes location information and, in said grouping step, adjacent objects are detected based on the location information.

* * * * *